Nov. 25, 1924.

Re. 15,954

P. T. SHARPLES

CENTRIFUGAL MACHINE

Original Filed July 14, 1919

INVENTOR
Philip T. Sharples
BY
Kenyon & Kenyon
ATTORNEYS

Reissued Nov. 25, 1924.

Re. 15,954

UNITED STATES PATENT OFFICE.

PHILIP TRIEST SHARPLES, OF MERION, PENNSYLVANIA.

CENTRIFUGAL MACHINE.

Original No. 1,401,196, dated December 27, 1921, Serial No. 310,661, dated July 14, 1919. Application for reissue filed August 14, 1923. Serial No. 657,438.

*To all whom it may concern:*

Be it known that I, PHILIP T. SHARPLES, a citizen of the United States, residing at Merion, in the county of Montgomery and State of Pennsylvania, have invented certain Improvements in Centrifugal Machines, of which the following is a specification.

This invention is designed primarily for feeding different liquids separately into the revolving bowl of a centrifugal machine and preferably so as to maintain the separation of such liquids after they have been introduced into the revolving bowl by delivering them to their respective zones.

In the centrifugal separation of the constituents of certain substances, it is important to use a carrier liquid for the purpose of keeping them, particularly a viscous or adhesive heavier constituent, from contact with the bowl of the centrifuge, and in such case it is frequently desirable that the carrier liquid should not mix with the substance to be separated.

It is a primary object of my invention to introduce a carrier liquid and a substance to be separated to their separate zones within the bowl prior to bringing them into contact.

The characteristic features and advantages of the improvements will be fully understood from their application set out in the following description and the accompanying drawings in illustration thereof.

Figure 1:
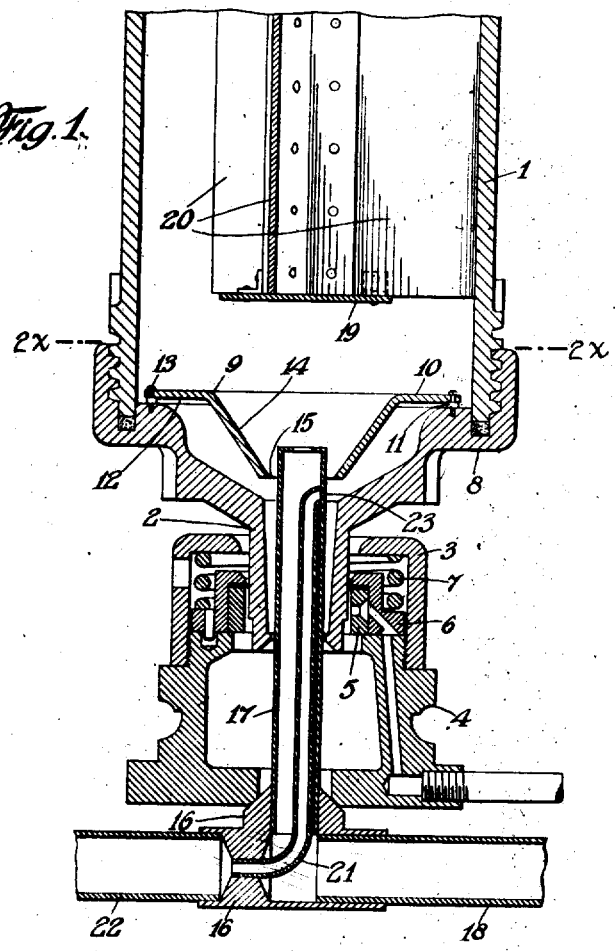
Figure 2:
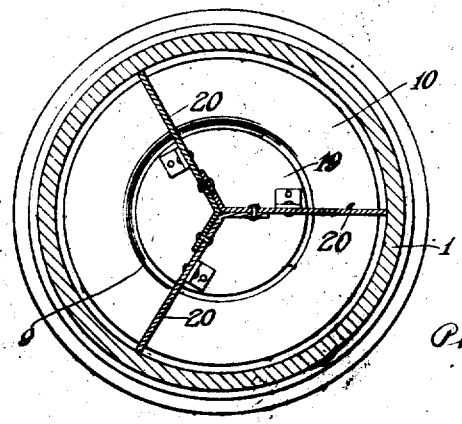

In the drawings, Figure 1 is a broken vertical sectional view taken through the bottom of a centrifuge bowl combined with feeding and controlling means, and Fig. 2 is a sectional view taken on the line 2×—2× of Fig. 1.

The mechanism shown in the drawings, by way of illustrating my invention, comprises the revoluble suspended bowl 1 provided with the axial bottom nipple or inlet tube 2, on which is telescoped a housing 3 detachably connected with a stationary bearing part 4, which supports, within the housing and surrounding the nipple 2, the bushing 5 engaging the nipple, the ferrule 6 telescoped on the bushing, and the coiled spring 7 holding the ferrule against the part or drag plug 4, to control the lateral movement of the bowl.

In accordance with my invention in its preferred form, the bowl bottom 8 has fixed thereon a diaphragm 9 having a periphery 10 which is supported on the bottom by the spacers 11, so as to provide the passages 12 and is fixed to the bottom by screws 13; the center of the diaphragm being a downwardly extending cone frustum 14 having an opening 15 disposed above the inlet nipple 2 in axial relation therewith.

The plug 4 has a coupling member 16 set in the bottom thereof. This coupling member 16 has connected therewith a nozzle 17, which extends through the drag plug 4, the nipple 2 and the aperture 15, and the conduit 18 communicating with the nozzle 17. A spreader 19 is fixed to the bottom of the wings 20 directly above the nozzle 17 and disperses the substance to be separated, which is discharged from the nozzle 17 as it is supplied from the conduit 18.

A second nozzle 21 extends from the conduit 22, connected therewith by the plug 16, through the nozzle 17, the nozzle 21 having an outlet 23 through the side of the nozzle 17 into the bottom of the bowl 1 beneath the diaphragm 9. The carrier liquid is thus delivered from the conduit 22 through the nozzle 21 below the diaphragm 9 and flows through the passages 12 to the wall of the bowl 1.

It will be understood that in operation, as the liquids are or may be delivered simultaneously under control by way of the conduits 18 and 22 through the respective nozzles 17 and 21 on opposite sides of the diaphragm 9 to the respective zones which they are to occupy in the revolving bowl, they will have no opportunity to mix and consequently no necessity exists for effecting their separation in the bowl by centrifugal force, the time and energy of centrifugal separation are devoted to the segregation of the constituents of the substance to be resolved, and the possibility of mechanical or chemical combination between the carrier liquid and the substance to be separated is reduced to a minimum.

An important application of my invention above described lies in its adaptation to the centrifugal separation of viscous or adhesive constituents from a substance containing them, for example the separation of water constituents from lubricating oil, or the stock from which such oil is produced, according to the inventions described in my patents, e. g., Nos. 1,232,104, 1,416,890 and 1,416,891. In the employment of this invention in the use and practice of those inventions under conditions wherein the contents of the bowl are substantially in a state of liquid balance, the carrier liquid on one side of a diaphragm within the bowl, such as the diaphragm 9, will substantially balance the substance to be separated and the carrier liquid on the other side of such diaphragm when the bowl 1 is rotating. The result will be that carrier liquid is delivered to its proper zone at the wall of the bowl prior to coming into contact with the substance to be separated and without such mixing with other substances within the bowl as might produce undesirable characteristics in the de-waxed oil. The de-waxed oil occupies the inner zone of the bowl and the carrier liquid does not pass through it in reaching its proper zone but it reaches its proper zone by being directed upon the surface of the carrier liquid that occupies the space on one side of diaphragm 9 and holds in balance the contents of the bowl on the other side of the diaphragm.

Having described my invention, I claim:

1. In a centrifugal machine, the combination with a revoluble bowl having an axial inlet, of means comprising a nozzle for delivering a substance through said inlet into said bowl and means comprising a second nozzle extending through the nozzle first named for delivering a second substance separately into said bowl.

2. In a centrifugal machine, the combination with a revoluble bowl having an axial inlet and containing a diaphragm provided with an aperture, of means comprising a nozzle for delivering a substance into said bowl through said inlet and aperture above said diaphragm and means comprising a nozzle for delivering a second substance to said bowl through said inlet below said diaphragm.

3. In a centrifugal machine, a revoluble bowl provided with an axial inlet, a spreader extending across the axis of said inlet and a diaphragm having an aperture disposed between said inlet and spreader, in combination with a nozzle for delivering a substance through said inlet and aperture to said spreader and a nozzle for delivering a second substance through said inlet and beneath said diaphragm.

4. In a centrifugal machine, the combination of a revoluble bowl, a diaphragm in the bottom of said bowl and means for delivering different substances through the bottom of said bowl on opposite sides of said diaphragm.

5. In a centrifugal separator, the combination of a rotating bowl, means for delivering to said bowl a substance to be resolved into certain of its constituents under the action of centrifugal force within said bowl, and means for delivering to its proper zone within said bowl, and while maintained out of contact with said substance, a carrier liquid that will occupy under the action of centrifugal force a zone of said bowl lying between said substance, or any of its constituents, and the wall of said bowl.

6. A centrifugal separator comprising a rotating bowl and means for delivering a plurality of substances, while maintained out of contact with one another, to the zones of said bowl that said substances respectively occupy therein under the action of centrifugal force while in contact within said bowl.

7. In a centrifugal separator, means for causing a substance that is to be separated in the separator and another substance to occupy respective zones while in contact within the separator under the action of centrifugal force, and means for delivering said substances, while maintained out of contact with one another, to said respective zones.

8. In a centrifugal separator, the combination of a rotating bowl, means for delivering to said bowl a substance to be resolved into certain of its constituents under the action of centrifugal force within said bowl, and means for delivering a carrier liquid, while maintained out of contact with said substance, to the zone of said bowl occupied by said carrier liquid under the action of centrifugal force wherein said carrier liquid is in contact with said substance or a constituent thereof.

9. In a centrifugal separator, a rotating bowl adapted to contain a substance to be separated and a carrier liquid, a diaphragm therein extending across the zone of said bowl occupied, while said bowl is rotating, by the substance to be separated to the zone of the carrier liquid, means for introducing the substance to be separated into said bowl on one side of said diaphragm and means for introducing the carrier liquid into said bowl on the other side of said diaphragm.

10. In a centrifugal separator, means for causing a substance to be separated and a carrier liquid to occupy respective zones under the action of centrifugal force, a diaphragm extending across the zone of the substance to be separated to the zone of the carrier liquid, means for supplying the substance to be separated on one side of said diaphragm, and means for supplying the carrier liquid on the other side of said diaphragm.

11. In a method of centrifugally separating a substance containing an adhesive or viscous constituent, the steps comprising subjecting the substance and a carrier liquid together to the action of centrifugal force and thereby maintaining them in respective zones, and delivering the substance and the carrier liquid, while maintained out of contact with each other, into their respective zones.

12. In a method of centrifugally separating a substance containing an adhesive or viscous constituent, the steps comprising maintaining an outer zone of carrier liquid by the action of centrifugal force, delivering inside of said zone the substance to be separated, and delivering carrier liquid, while maintained out of contact with said substance, to its proper zone.

13. In a method of centrifugally separating a substance containing an adhesive or viscous constituent, the steps comprising maintaining a zone of carrier liquid under the action of centrifugal force, and delivering the substance that is to be separated by the action of centrifugal force, while maintaining the substance out of contact with the carrier liquid, inside of said zone of carrier liquid.

14. In a method of centrifugally separating a substance by the use of a carrier liquid, the method of feeding carrier liquid to the centrifugal bowl without mixture with the substance to be separated which comprises maintaining a body of carrier liquid in substantial balance with the several ingredients of the contents of the bowl under the action of centrifugal force, and feeding carrier liquid to the body thereof while maintained out of contact with said substance.

15. In a centrifugal machine having a bowl mounted for rotation and adapted when rotating to maintain two substances therein in separate zones and having a passage extending radially across the inner one of said zones and discharging into the outer one of said zones, means for delivering the substance contained in said inner zone to that zone, and means for delivering the substance contained in said outer zone into the radially inward end of said passage.

16. In a centrifugal machine, a rotating bowl, means for delivering a first substance to an inner zone of said bowl, and means for delivering to its proper zone of said bowl, while maintained out of contact with said first substance, a second substance that will occupy under the action of centrifugal force a zone of said bowl lying outside of said first zone.

17. In a method of centrifugally treating a substance the steps comprising maintaining a plurality of substances in inner and outer zones by the action of centrifugal force, delivering to said inner zone the substance occupying said zone, and delivering to said outer zone, while maintained out of contact with the substance contained in said inner zone, the substance occupying said outer zone.

Signed at Philadelphia, in the county of Philadelphia and State of Penna., this 10th day of August, 1923.

PHILIP TRIEST SHARPLES